(12) United States Patent
Wen

(10) Patent No.: US 9,971,978 B2
(45) Date of Patent: May 15, 2018

(54) EVENT-BASED DATA MANAGEMENT METHOD AND DEVICE

(71) Applicant: Beijing Jingoal Information Technology Co., Ltd., Beijing (CN)

(72) Inventor: Rong Wen, Beijing (CN)

(73) Assignee: Beijing Jingoal Information Technology Co., Ltd., Beijing (CN)

( * ) Notice: Subject to any disclaimer, the term of this patent is extended or adjusted under 35 U.S.C. 154(b) by 0 days. days.

(21) Appl. No.: 15/140,604

(22) Filed: Apr. 28, 2016

(65) Prior Publication Data

US 2017/0060647 A1    Mar. 2, 2017

(30) Foreign Application Priority Data

Aug. 31, 2015 (CN) .......................... 2015 1 0548092

(51) Int. Cl.
  *G06Q 10/06*    (2012.01)
(52) U.S. Cl.
  CPC .................................. *G06Q 10/06* (2013.01)

(58) Field of Classification Search
  None
  See application file for complete search history.

(56) References Cited

U.S. PATENT DOCUMENTS

2002/0161736 A1*  10/2002  Beygelzimer ..... G06F 17/30716
2012/0136878 A1*   5/2012  Cypher ............. G06F 17/30327
                                                              707/752

* cited by examiner

*Primary Examiner* — Syed Roni
(74) *Attorney, Agent, or Firm* — Arent Fox LLP; Michael Fainberg

(57) ABSTRACT

The invention discloses an event-based data management method and apparatus. The method includes: for uniform management of data related to events, creating an event axis connecting the respective events, and creating one or more work boxes related to the respective events, under the event axis; and referring to or newly creating the related data in a work box, and managing the event axis, the work box, and/or the related data, wherein the related data comprise different types of data corresponding to different types of applications.

14 Claims, 4 Drawing Sheets

For uniform management of data related to events, creating an event axis connecting the respective events, and creating one or more work boxes related to the respective events, under the event axis — Step 101

Referring to or newly creating the related data in a work box, and managing an event axis, the work box, and/or the related data, wherein the related data comprise different types of data corresponding to different types of applications — Step 102

US 9,971,978 B2

EVENT-BASED DATA MANAGEMENT METHOD AND DEVICE

CROSS-REFERENCES TO RELATED APPLICATIONS

This application claims the benefit of priority to Chinese Patent Application No. 201510548092.1, filed on Aug. 31, 2015 an entitled "Event-Based Data Management Method and Device", the content of which is incorporated herein by reference in its entirety.

TECHNICAL FIELD

The present invention relates to the field of computers and particularly to an event-based data management method and device.

BACKGROUND

In the prior art, in order to satisfy an office demand of a user, a number of applications capable of offering various office functions have been developed, e.g., email management, a calendar, a memorandum, table making, data making, data management, etc., all of which can perform their particular functions, where many of the applications are managed at respective levels, sub-levels can be created for the applications, and the applications can be extended at several levels so that the respective applications can be accessed more conveniently.

As described above, various formats or various types of data may be generated for the existing numerous office applications. At present the data generated by the large number of office applications cannot be managed centrally.

SUMMARY

In view of the problem above in the prior art, the invention has been made to provide an event-based data management method and device so as to overcome or at least partially address the problem above.

In one exemplary embodiment, an event-based data management method includes: for uniform management of data related to events, creating an event axis connecting the respective events, and creating one or more work boxes related to the respective events, under the event axis; and referring to or newly creating the related data in a work box, and managing the event axis, the work box, and/or the related data, wherein the related data comprise different types of data corresponding to different types of applications.

In another exemplary embodiment, an event-based data management device includes: a creating module configured, for uniform management of data related to events, to create an event axis connecting the respective events, and to create one or more work boxes related to the respective events, under the event axis; and a managing module configured to refer to or newly creating the related data in a work box, and to manage the event axis, the work box, and/or the related data, wherein the related data comprise different types of data corresponding to different types of applications.

The foregoing description is merely a summary of the technical solutions of the invention, and particular embodiments of the invention will be described below in order to make the technical solutions of the invention more apparent and to practice the disclosure of the invention, and in order to make the foregoing and other objects, features, and advantages of the invention more apparent.

BRIEF DESCRIPTION OF THE DRAWINGS

Various other advantages and benefits will become apparent to those ordinarily skilled in the art upon review of the following detailed description of preferred embodiments. The drawings are merely intended to illustrate the preferred embodiments but not to limit the invention. Like reference numerals will denote like components throughout the drawings in which.

DETAILED DESCRIPTION OF THE EMBODIMENTS

Figure 1:
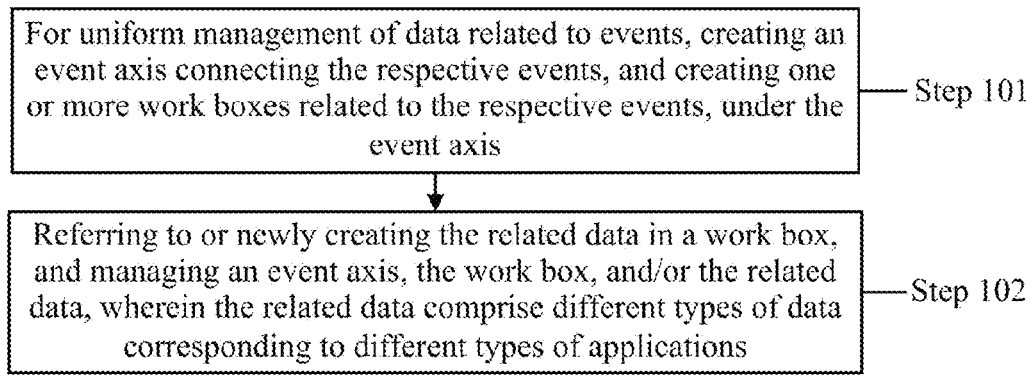
FIG. 1 is a flow chart of an event based data management method according to an embodiment of the invention.

Exemplary embodiments of the disclosure will be described below in further details with reference to the drawings. Although the exemplary embodiments of the disclosure are illustrated in the drawings, it shall be appreciated that the disclosure can be practiced in various forms but will not be limited to the embodiments described here. On the contrary, these embodiments are provided in order to make the disclosure more apparent, and to convey the scope of the disclosure fully to those skilled in the art.

In prior art the data generated by the large number of office applications cannot be managed centrally, the data cannot be associated with each other, and the data cannot be nested into each other. However in real application scenarios, a large number of different types of data which cannot be managed centrally may be associated by the same event, for example, various types of data in the same item need to be viewed or operationally managed uniformly. In the prior art, the data associated with the event can only be viewed separately, but the respective data associated with the event cannot be managed uniformly, so that the process may be time-consuming and laborious. In view of this, a method and device for managing various types of data uniformly is highly desirable at present.

In order to address the problem in the prior art that data associated with the same event can only be operationally managed separately so that information can not be obtained in a timely manner, the invention provides an event based data management method and device, and in a method for visualizing data management on an event axis in a technical solution according to an embodiment of the invention, various types of data in the same event can be managed conveniently, and states of all the data can be indicated in real time. Respective different events can be managed in parallel conveniently on event axes, and data of all the events can be managed conveniently. The invention will be described below in further details with reference to the drawings and the embodiments. It shall be appreciated that the particular embodiments described here are merely intended to illustrate but not limit the invention.

Method Embodiment

An embodiment of the invention provides an event based data management method, and FIG. 1 is a flow chart of an event based data management method according to an embodiment of the invention. As illustrated in FIG. 1, the event based data management method according to the embodiment of the invention includes the following steps:

The step 101 is, for uniform management of data related to events, to create an event axis connecting the respective events, and to create one or more work boxes related to the respective events, under the event axis; where an even axis refers to an axis connecting a serials events in a certain order, e.g. temporal order, event priority order, privilege order and so on, each event including at least one work box, a work box refers to a collection of a certain category of data, the category can be sorted temporally, spatially or as required for simplifying management, and the data refers to data included in different applications in different categories. That is, the event axis connects scattered data for centralizing and unifying management, and work box collects and resorts scattered data for enhancing visualization and classification management;

In an embodiment of the invention, in order to manage the data more conveniently, participants, and operating privileges of the respective participants will be further set for an event axis and a work box, and in a real application, the participants include a creator, a manager, members, etc., and the operating privileges of the respective participants are different from each other and can be set flexibly dependent upon a real condition. Before a user operates on the event axis, the work box, or related data, it will be judged from the operating privilege of the user whether he or she is allowed for the corresponding operation, to thereby improve the security of data management.

In a real application, one or more sub-work boxes can be further created under a work box, the related data can be referred to or newly created in a sub-work box, and the related data in the sub-work box can be managed, where the work box include one or more levels of sub-work box or boxes. Alike a sub-work box is also a work box, and participants, and operating privileges of the respective participants can also be set for the sub-work box.

In an embodiment of the invention, in order for the user to manage an event axis conveniently, the type of the event axis can be set, and the event axis can be categorized and managed based upon the type thereof.

The step 102 is to refer to or newly create the related data in a work box, and to manage the event axis, the work box, and/or the related data, where the related data include different types of data corresponding to different types of applications.

In an embodiment of the invention, if the state of the related data is changed, then the data state can be indicated on the work box where the related data are located, to a preset user in a preset indication pattern.

Moreover in order for the user to create the event axis conveniently, the created event axis can be stored as a template and/or a template can be preset, and invoked to create the event axis corresponding to the event.

In the step 102, the related data are referred to or newly created in the work box particularly as follows:

The existing related data are referred to in the work box; or the related data are newly created on a presentation interface of a corresponding application in the work box; or the related data are newly created by invoking directly a corresponding application in the work box.

In the step 102, the event axis, the work box or boxes and/or the related data are managed particularly as follows:

1. The event axis is set or deleted on an event axis management interface;
2. The work box is set, deleted, moved and/or newly added on an work box \management interface; and
3. The related data are managed by invoking in the work box a presentation interface of an application corresponding to a data type of the related data; or the related data in the work box are managed by invoking in the work box an application corresponding to a data type of the related data, where the management includes viewing data, deleting data and/or modifying data.

In an embodiment of the invention, after the related data are referred to in the work box of the event axis, the user can view and manage the related data conveniently on the event axis.

It shall be noted that in an embodiment of the invention, an event can be a product, an item, a plan, a person, a folder, a piece of software, etc., and generally any thing capable of including various information as long as a number of associated events need to be managed uniformly, and particularly an event axis is newly created, and the name of the event is created.

The data referred to in event based data management can be data generated by software across platforms, or a network address, or a hyper link to a different system, or other data, and the data as referred to in the embodiment of the invention include but will not be limited to the data described above as long as the data can be managed uniformly in the technical solution according to the embodiment of the invention.

The technical solution above according to the embodiment of the invention will be described below by way of an example with reference to the drawings.

Figure 2:
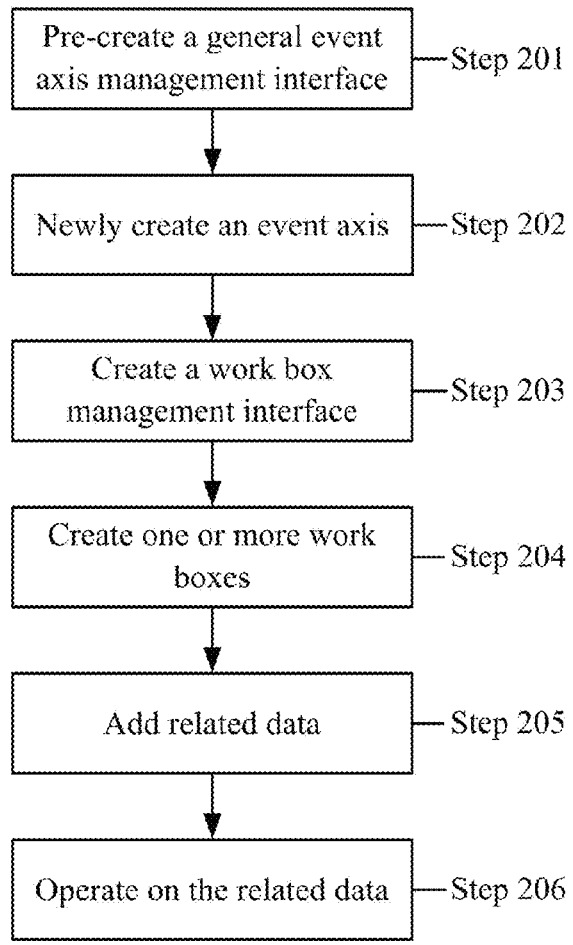
FIG. 2 is a flow chart of another process of the event based data management method according to another embodiment of the invention.
Figure 3:
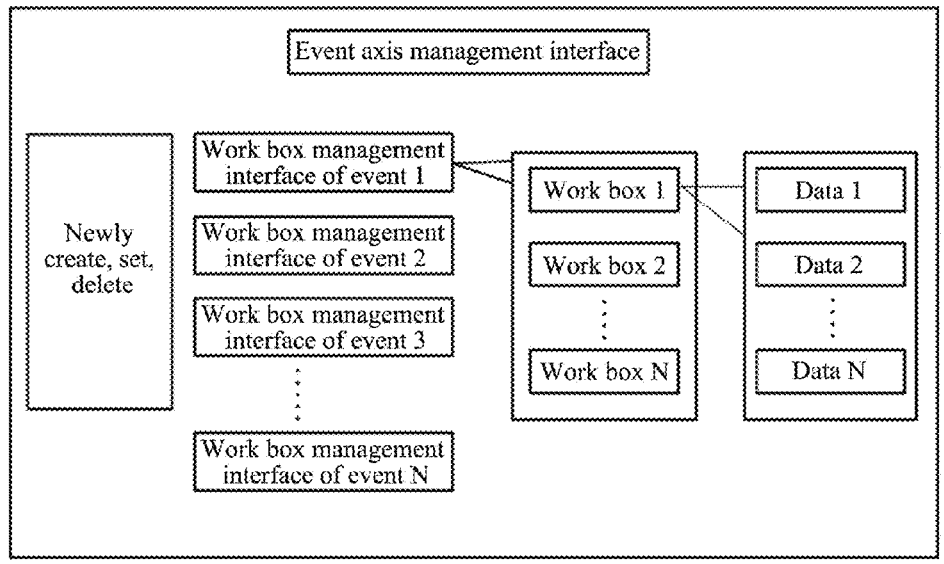
FIG. 3 is a schematic structural diagram of a system for the event based data management method according to another embodiment of the invention.

FIG. 2 is a flow chart of another process of the event based data management method according to the embodiment of the invention, and FIG. 3 is a schematic structural diagram of a system for the event based data management method according to the embodiment of the invention. As illustrated in FIG. 3, in a real application, there may be a number of event axes in the event axis management interface, e.g., an event axis 1, an event axis 2, . . . , and an event axis N, each of which corresponds to an event, for example, which is a business department of a company, or a work item. A number of work boxes are arranged on the respective event axes, e.g., a work box 1, a work box 2, . . . , and a work box N; and pieces of data can be further referred to in the respective work boxes, e.g., data 1, data 2, . . . , and data N.

In the structure of the system as illustrated in FIG. 3, the event based data management method according to the embodiment of the invention as illustrated in FIG. 2 particularly includes the following steps:

As illustrated in FIG. 3, the step 201 is to pre-create a general event axis management interface on which all the event axes can be managed by setting, newly creating and deleting a function, managing a personal event axis, etc., where the respective event axes to be managed can be categorized, or managed in parallel.

Figure 4:
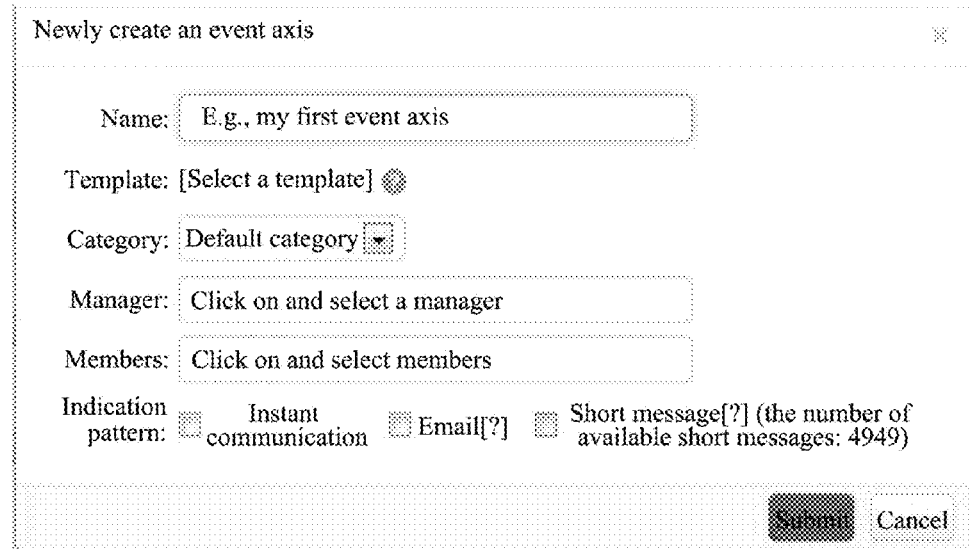
FIG. 4 is a schematic diagram of creating an event axis according to another embodiment of the invention.

The step 202 is to newly create an event axis, where as illustrated in FIG. 4, the event axis can be newly created by categorizing the event axis, and setting a creator, a manager, members, a template, a state indication pattern, and other parameters. It shall be noted that the creator, the manager, and the members created as participates mentioned above, and in a real application, different names can be set for the participates according to their operating privileges.

As illustrated in FIG. 3, the step 203 is to create a work box management interface, where in a separate work box, a creator, a manager, members, and other participates, and operating privileges of the respective participates can be set, and all the work boxes under the event axis can be newly created or modified.

Figure 5:
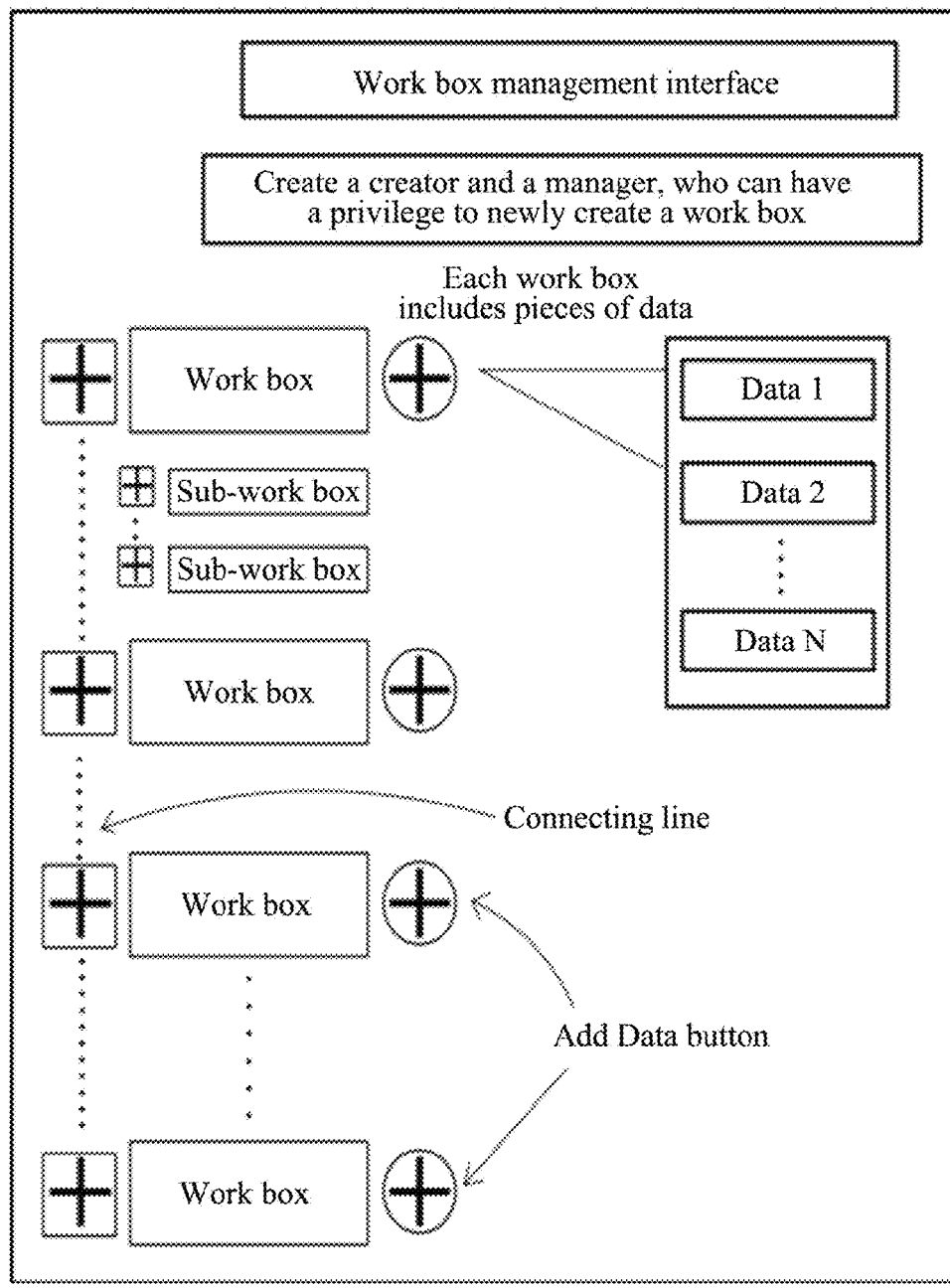
FIG. 5 is a schematic diagram of managing work boxes according to another embodiment of the invention.

In the step 204, if there is a lot of information to be managed uniformly for an event, then as illustrated in FIG. 5, one or more work boxes will be created to thereby facilitate visualized management; and in an embodiment of the invention, the creator and the manager of the event axis have a privilege to newly create or modify all the work boxes under the event axis.

Figure 6:
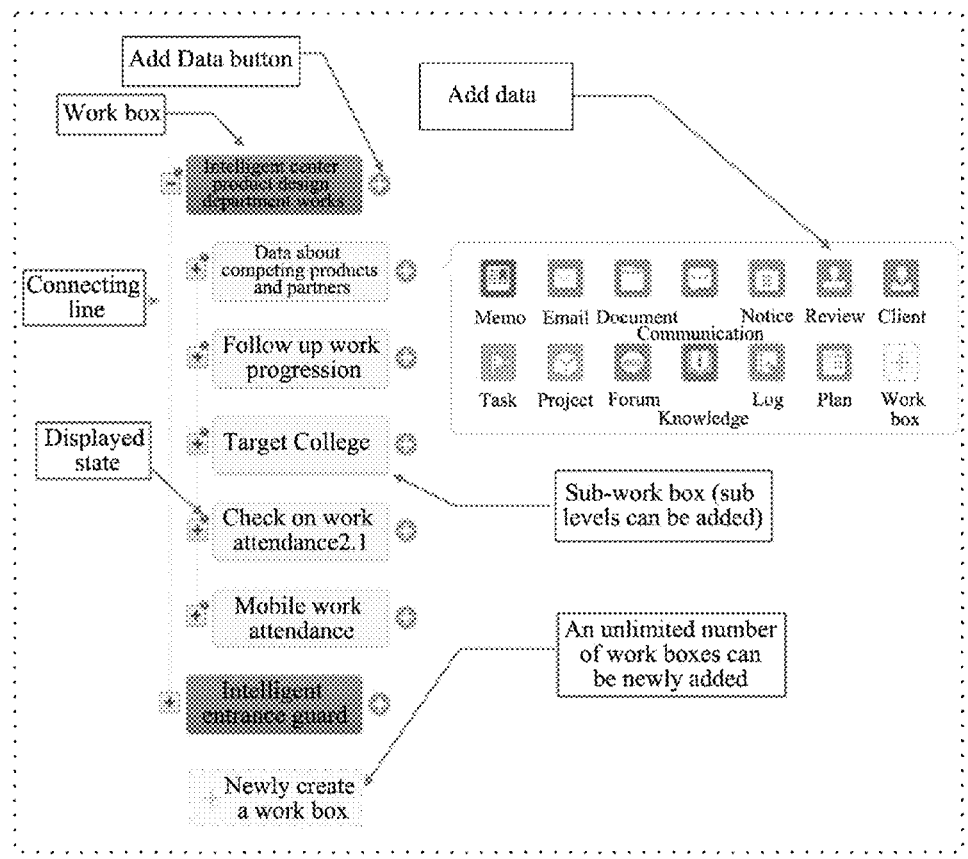
FIG. 6 is a schematic diagram of an event axis according to another embodiment of the invention.

Particularly in an embodiment of the invention, as illustrated in FIG. 6, participates can be set for the work box, and the participates have a privilege to modify and view data in the work box; and the work box can include various data, which can be data generated by various software, e.g., data of an email, a client, a task, a folder, a person, a forum, or in another format; and in order to facilitate categorization and management of information, a sub-work box can be further created for the work box. As illustrated in FIG. 5, the sub-work box is managed by the work box, and has the same function to add data as the work box.

In an embodiment of the invention, a state to be displayed can be set for an event and a work box, including In Progress, Update, Done, and other states, and if a lower level of work box, a sub-work box, or data, of the work box are changed, then the state will be indicated in real time; and preferably the state can be indicated on a displayed interface, as an email alert, instant communication, a short message, or in other various indication patterns; the change in data at the lower level can be presented directly in a displayed state of the upper level; and the state can be indicated partially or completely to the corresponding creator, manager, or members. It shall be noted that the upper level is the level of work box adding the data.

As illustrated in FIG. 5, in an embodiment of the invention, a number of work boxes can be created in parallel in the same event management item. In order to facilitate visualized management, as illustrated in FIG. 6, the parallel work boxes can be connected by connecting lines at levels, where the work boxes at the same level are connected by the same connecting line. All the data under a work box are arranged and managed uniformly.

The step 205 is to add related data, where as illustrated in FIG. 5 and FIG. 6, various data related to the work box can be added using an Add Data button.

In an embodiment of the invention, data associated with either the work box or the sub-work box need to be added using the Add Data button, where the added data are managed by the level of work box; and moreover the states of all the data of a certain level are associated with the upper level of work box, and a change in data will be presented in real time in the state of the upper level of work box.

The step 206 is to operate on the related data, where the related data of the event axis can be operated on directly on the event axis, where the software or the data can be entered directly with the same effect as separately operating on the software directly; and if some associated software or data are operated on directly, then a change in data will also be presented on the associated event axis as a displayed state.

In the embodiment of the invention, the events are categorized, the work boxes are arranged at levels, and the data are referred to, to thereby facilitate visualized categorization and management so that a change in data at a lower level can be presented directly in a displayed state of an upper level.

In summary the technical solution according to the embodiments of the invention proposes a visualized data management method capable of managing various software and data uniformly so as to address the problem that data associated in the same event need to be operationally managed separately so that information can not be obtained in a timely manner, so a lot of associated information can be managed conveniently, and indicated directly to the related creator, manager, and members in a preset indication pattern to thereby greatly improve the work efficiency.

Device Embodiment

Figure 7:
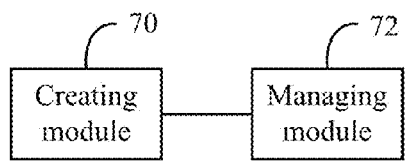
FIG. 7 is a schematic structural diagram of an event based data management device according to another embodiment of the invention.

An embodiment of the invention provides an event base data management device, and FIG. 7 is a schematic structural diagram of an event base data management device according to an embodiment of the invention. As illustrated in FIG. 7, the event base data management device according to the embodiment of the invention includes a creating module 70, and a managing module 72, where the respective modules in the embodiment of the invention will be described below in details.

The creating module 70 is configured, for uniform management of data related to events, to create an event axis connecting the respective events, and to create one or more work boxes related to the respective events, under the event axis; where an even axis refers to an axis connecting a serials events in a certain order, e.g. temporal order, event priority order, privilege order and so on, each event including at least one work box, a work box refers to a collection of a certain category of data, the category can be sorted temporally, spatially or as required for simplifying management, and the data refers to data included in different applications in different categories. That is, the event axis connects scattered data for centralizing and unifying management, and work box collects and resorts scattered data for enhancing visualization and classification management; and The creating module 70 can set participations, and operating privileges of the respective participations for the event axes and the work boxes. The creating module 70 can create one or more sub-work boxes under a work box; set the type of an event axis; and invoke a template to create the event axis corresponding to the event.

The managing module 72 is configured to refer to or newly create the related data in a work box, and to manage the event axis, the work box, and/or the related data, where the related data include different types of data corresponding to different types of applications.

The managing module 72 can further refer to or newly create the related data in a sub-work box, and manage the related data in the sub-work box, where the work box includes one or more levels of sub-work boxes.

The managing module 72 can categorize and manage an event axis based upon a type thereof.

If the state of the related data is changed, then the managing module 72 can further indicate a data state on the work box/boxes where the related data are located, to a preset user in a preset indication pattern.

The managing module 72 can further store the created event axis as a template and/or preset a template;

The managing module 72 is configured:

To refer to the existing related data in the work box; or to newly create the related data on a presentation interface of a corresponding application in the work box; or to newly create the related data by invoking directly a corresponding application in the work box.

The event axis is set or deleted on an event axis management interface; the work box is set, deleted, moved and/or newly added on an work box management interface; and the related data are managed by invoking in the work box a presentation interface of an application corresponding to a data type of the related data; or the related data in the work box are managed by invoking in the work box an application corresponding to a data type of the related data, where the management includes viewing data, deleting data and/or modifying data.

Reference can be made to the corresponding description of the method embodiment for particular processes in the respective modules according to the embodiment of the invention, so a repeated description thereof will be omitted here.

In summary, in the technical solutions according to the embodiments of the invention, the event management items are created on the event axes, the work boxes are created in the event management items, and the data related to the events are referred to in the work boxes, thus addressing the problem in the prior art that the related data can not be managed uniformly, so as to manage the various data in the same event conveniently and rapidly, and to manage the respective different events in parallel conveniently on the event axes to thereby enhance the visibility of data management and improve the efficiency of working by a user.

Apparently those skilled in the art can make various modifications and variations to the invention without departing from the spirit and scope of the invention. Thus if these modifications and variations to the invention fall into the scope of the claims of the invention and their equivalents, then the invention is also intended to encompass these modifications and variations.

The algorithm and the display provided here are not inherently relevant to any particular computer, virtual system or another device. Various general-purpose systems can also be used together based upon the teaching here. A structure required to embody the systems will be apparent from the description above. Moreover the invention is not specific to any particular programming language. It shall be appreciated that the disclosure of the invention described here can be embodied using various programming languages, and the description above given for the particular language is intended to disclose the best mode of the invention.

Numerous details have been described in the description provided here. However it can be appreciated that the embodiments of the invention can be put into practice without these particular details. Well-known methods, structures and technologies have not been described in details in some instances so as not to obscure understanding of the description.

Similarly it shall be appreciated that in order to simplify the disclosure and facilitate understanding one or more of the respective aspects of the invention, the respective features of the invention are sometimes grouped together into an embodiment, a figure, or the description thereof, throughout the description above of the exemplary embodiments of the invention. However the method disclosed here shall not be construed as reflecting such an intension that the invention as claimed requires more features than those expressively recited in the respective claims. More exactly, as reflected in the appended claims, the aspects of the invention lie in fewer than all the features in the respective embodiments disclosed above. Thus the claims complying with the particular embodiments are hereby incorporated expressively into the particular embodiments, where the respective claims per se are separate embodiments of the invention.

Those skilled in the art can appreciate that the modules in the client in the embodiments can be adapted, and arranged in one or more clients different from that in the embodiments. The modules in the embodiments can be combined into a module, and moreover they can be separated into sub-modules or sub-units or sub-components. Unless some of the features and/or processes or units are mutually exclusive, the respective features disclosed in the specification (including the appended claims, the abstract, and the drawings), and the respective processes or units of any method or client disclosed as such can be applied in any combination. Unless expressively stated otherwise, the respective features disclosed in the specification (including the appended claims, the abstract, and the drawings) can be replaced by alternative features achieving the same, equivalent or similar purpose.

Moreover those skilled in the art can appreciate that some embodiments here include some features in the other embodiments instead of the other features thereof, the features of the different embodiments can be combined in further different embodiments without departing from the scope of the invention. For example, any one of the embodiments claimed in the appended claims can be applied in any combination.

The respective components in the embodiments of the invention can be embodied in hardware, or in software modules operating on one or more processors, or in a combination thereof. Those skilled in the art shall appreciate that some or all of the functions of some or all of the components in the client loaded with ranked network addresses according to the embodiments of the invention can be performed in practice by a micro processor or a Digital Signal Processor (DSP). The invention can alternatively be embodied as a device or apparatus program for performing a part or all of the method described here (e.g., a computer program and a computer program product). Such a program in which the invention is embodied can be stored on a computer readable medium, or can be embodied in the form of one or more signals. Such a signal or signals can be downloaded from an Internet web site, or can be available over a carrier signal, or can be provided in any other form.

It shall be noted that the embodiments above are intended to illustrate but not to limit the invention, and those skilled in the art can devise alternative embodiments without departing from the scope of the appended claims. Any reference numerals placed in the parentheses in the claims shall not be construed as limiting the claims. The term "comprising" will not preclude the presence of an element or a step which is not listed in the other claim(s). "A" or "an" preceding an element will not preclude the presence of a plurality of such elements. The invention can be embodied in hardware including several different elements, plus an appropriately programmed computer. In a device claim listing several units, several of these units can be embodied particularly as the same item of hardware. The use of the terms "first", "second", "third", etc., is not intended to suggest any order. These terms can be constructed as referring to names.

The invention claimed is:

1. An event base data management method, comprising:
   for uniform management of data related to events, creating an event axis connecting the respective events, and creating one or more work boxes related to the respective events, under the event axis; and referring to or newly creating the related data in one of the created work box, and managing the event axis, the work box, and/or the related data, wherein the related data comprise different types of data corresponding to different types of applications;

wherein managing the event axis, the work box, and/or the related data comprises:

setting or deleting the event axis on an event axis management interface;

setting, deleting, moving and/or newly adding the work box on an work box management interface; and managing the related data by invoking in the work box a presentation interface of an application corresponding to a data type of the related data; or managing the related data in the work box by invoking in the work box an application corresponding to a data type of the related data, wherein the managing the related data comprises viewing data, deleting data and/or modifying data.

2. The method according to claim 1, wherein the method further comprises:

setting participations, and operating privileges of the respective participations for the event axis and the work boxes.

3. The method according to claim 1, wherein the method further comprises:

creating one or more sub-work boxes under a work box; referring to or newly creating the related data in a sub-work box; and managing the related data in the sub-work box, wherein the work box comprises one or more levels of sub-work boxes.

4. The method according to claim 1, wherein the method further comprises: setting a type of the event axis; and categorizing and managing the event axis based upon the type thereof.

5. The method according to claim 1, wherein the method further comprises: if a state of the related data is changed, then indicating a data state on the work box where the related data are located, to a preset user in a preset indication pattern.

6. The method according to claim 1, wherein the method further comprises:

storing the created event axis as a template and/or presetting a template; and creating the event axis corresponding to the event by invoking the template.

7. The method according to claim 1, wherein referring to or newly creating the related data in the work box comprises:

referring to existing related data in the work box; or newly creating the related data on a presentation interface of a corresponding application in the work box; or newly creating the related data by invoking directly a corresponding application in the work box.

8. An event base data management device, comprising:

at least one processor and a memory;

wherein the memory stores computer readable program codes, and the at least one processor is configured to execute the computer readable program codes to:

for uniform management of data related to events, create an event axis connecting the respective events, and create one or more work boxes related to the respective events, under the event axis; and refer to or newly creating the related data in one of the created work boxes, and to manage the event axis, the work box, and/or the related data, wherein the related data comprise different types of data corresponding to different types of applications;

wherein the at least one processor is further configured to execute the computer readable program codes to:

set or delete the event axis on an event axis management interface;

set, delete, move and/or newly add the work box on an work box management interface; and manage the related data by invoking in the work box a presentation interface of an application corresponding to a data type of the related data; or to manage the related data in the work box by invoking in the work box an application corresponding to a data type of the related data, wherein the managing the related data comprises viewing data, deleting data and/or modifying data.

9. The device according to claim 8, wherein:

the at least one processor is further configured to execute the computer readable program codes to:

set participations, and operating privileges of the respective participations for the event axes and the work boxes.

10. The device according to claim 8, wherein:

the at least one processor is further configured to execute the computer readable program codes to:

create one or more sub-work boxes under a work box; and refer to or newly create the related data in a sub-work box; and manage the related data in the sub-work box, wherein the work box comprises one or more levels of sub-work boxes.

11. The device according to claim 8, wherein:

the at least one processor is further configured to execute the computer readable program codes to:

a type of the event axis; and categorize and manage the event axis based upon the type thereof.

12. The device according to claim 8, wherein:

the at least one processor is further configured to execute the computer readable program codes to:

if a state of the related data is changed, indicate a data state on the work box where the related data are located, to a preset user in a preset indication pattern.

13. The device according to claim 8, wherein:

the at least one processor is further configured to execute the computer readable program codes to:

store the created event axis as a template and/or preset a template; and create the event axis corresponding to the event by invoking the template.

14. The device according to claim 8, wherein:

the at least one processor is further configured to execute the computer readable program codes to:

refer to existing related data in the work box; or newly create the related data on a presentation interface of a corresponding application in the work box; or newly create the related data by invoking directly a corresponding application in the work box.

* * * * *